(12) United States Patent
Elharrar et al.

(10) Patent No.: US 11,195,043 B2
(45) Date of Patent: Dec. 7, 2021

(54) SYSTEM AND METHOD FOR DETERMINING COMMON PATTERNS IN MULTIMEDIA CONTENT ELEMENTS BASED ON KEY POINTS

(71) Applicant: Cortica, Ltd., Tel Aviv (IL)

(72) Inventors: Dan Elharrar, New York, NY (US); Marco Rossi, New York, NY (US)

(73) Assignee: Cortica, Ltd., Tel Aviv (IL)

( * ) Notice: Subject to any disclaimer, the term of this patent is extended or adjusted under 35 U.S.C. 154(b) by 0 days.

(21) Appl. No.: 15/455,363

(22) Filed: Mar. 10, 2017

(65) Prior Publication Data
US 2017/0185845 A1    Jun. 29, 2017

Related U.S. Application Data

(63) Continuation-in-part of application No. 15/336,218, filed on Oct. 27, 2016, now Pat. No. 11,037,015.

(60) Provisional application No. 62/307,511, filed on Mar. 13, 2016, provisional application No. 62/267,398, filed on Dec. 15, 2015.

(51) Int. Cl.
*G06K 9/46*    (2006.01)
*G06K 9/00*    (2006.01)

(52) U.S. Cl.
CPC ....... *G06K 9/4604* (2013.01); *G06K 9/00744* (2013.01)

(58) Field of Classification Search
CPC .................................................. G06K 9/00718
USPC ........................................................ 382/218
See application file for complete search history.

(56) References Cited

U.S. PATENT DOCUMENTS

| | | | |
|---|---|---|---|
| 4,733,353 | A | 3/1988 | Jaswa |
| 4,932,645 | A | 6/1990 | Schorey et al. |
| 4,972,363 | A | 11/1990 | Nguyen et al. |
| 5,214,746 | A | 5/1993 | Fogel et al. |
| 5,307,451 | A | 4/1994 | Clark |

(Continued)

FOREIGN PATENT DOCUMENTS

| | | |
|---|---|---|
| EP | 1085464 A3 | 1/2007 |
| WO | 2016070193 A1 | 5/2016 |

OTHER PUBLICATIONS

The International Search Report and the Written Opinion for PCT/US2016/059111, ISA/RU, Moscow, Russia, dated Jan. 19, 2017.

(Continued)

*Primary Examiner* — Justin P. Misleh
(74) *Attorney, Agent, or Firm* — Reches Patents

(57) ABSTRACT

A system and method for method for determining common patterns based on key points in multimedia data elements (MMDEs). The method includes: identifying a plurality of candidate key points in each of the plurality of MMDEs, wherein a size of each candidate key point is equal to a predetermined size and a scale of each candidate key point is equal to a predetermined scale; analyzing the identified candidate key points to determine a set of properties for each candidate key point; comparing the sets of properties of the plurality of candidate key points of each MMDE; selecting, for each MMDE, a plurality of key points from among the candidate key points based on the comparison; generating, based on the key points for each MMDE, a signature for the MMDE; and comparing the signatures of the plurality of MMDEs to output at least one common pattern among the plurality of MMDEs.

20 Claims, 12 Drawing Sheets

(56) References Cited

U.S. PATENT DOCUMENTS

| | | |
|---|---|---|
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador et al. |
| 5,745,678 A | 4/1998 | Herzberg et al. |
| 5,763,069 A | 6/1998 | Jordan |
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,978,754 A | 11/1999 | Kumano |
| 5,991,306 A | 11/1999 | Burns et al. |
| 6,052,481 A | 4/2000 | Grajski et al. |
| 6,070,167 A | 5/2000 | Qian et al. |
| 6,075,881 A | 6/2000 | Foster et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,269,307 B1 | 7/2001 | Shinmura |
| 6,275,599 B1 | 8/2001 | Adler et al. |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,711,293 B1 | 3/2004 | Lowe |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,963,975 B1 | 11/2005 | Weare |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,139,372 B2 | 11/2006 | Chakravorty et al. |
| 7,158,681 B2 | 1/2007 | Persiantsev |
| 7,215,828 B2 | 5/2007 | Luo |
| 7,260,564 B1 | 8/2007 | Lynn et al. |
| 7,299,261 B1 | 11/2007 | Oliver et al. |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,353,224 B2 | 4/2008 | Chen et al. |
| 7,376,672 B2 | 5/2008 | Weare |
| 7,409,208 B1 | 8/2008 | Clare et al. |
| 7,433,895 B2 | 10/2008 | Li et al. |
| 7,464,086 B2 | 12/2008 | Black et al. |
| 7,529,659 B2 | 5/2009 | Wold |
| 7,657,100 B2 | 2/2010 | Gokturk et al. |
| 7,660,468 B2 | 2/2010 | Gokturk et al. |
| 7,801,893 B2 | 9/2010 | Gulli |
| 7,860,895 B1 | 12/2010 | Scofield |
| 7,933,407 B2 | 4/2011 | Keidar et al. |
| 8,023,739 B2 | 9/2011 | Hohimer et al. |
| 8,098,934 B2 | 1/2012 | Vincent |
| 8,108,881 B2 | 1/2012 | Hamel |
| 8,266,185 B2 | 9/2012 | Raichelgauz et al. |
| 8,275,764 B2 | 9/2012 | Jeon |
| 8,311,950 B1 | 11/2012 | Kunal |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| RE44,225 E | 5/2013 | Aviv |
| 8,457,827 B1 | 6/2013 | Ferguson et al. |
| 8,468,164 B1 | 6/2013 | Paleja et al. |
| 8,495,489 B1 | 7/2013 | Everingham |
| 8,510,734 B2 | 8/2013 | Criddle et al. |
| 8,527,978 B1 | 9/2013 | Sallam |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,880,640 B2 | 11/2014 | Graham |
| 8,886,648 B1 | 11/2014 | Procopio et al. |
| 8,990,199 B1 | 3/2015 | Ramesh et al. |
| 9,165,406 B1 | 10/2015 | Gray et al. |
| 9,252,961 B2 | 2/2016 | Bosworth |
| 9,298,763 B1 | 3/2016 | Zack |
| 9,323,754 B2 | 4/2016 | Ramanathan et al. |
| 9,325,751 B2 | 4/2016 | Bosworth |
| 9,440,647 B1 | 9/2016 | Sucan |
| 9,466,068 B2 | 10/2016 | Raichelgauz et al. |
| 9,542,694 B2 | 1/2017 | Bosworth |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,875,445 B2 | 1/2018 | Amer et al. |
| 9,911,334 B2 | 3/2018 | Townsend |
| 9,984,369 B2 | 5/2018 | Li et al. |
| 9,996,845 B2 | 6/2018 | Zhang |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze |
| 2001/0038876 A1 | 11/2001 | Anderson |
| 2002/0010682 A1 | 1/2002 | Johnson |
| 2002/0010715 A1 | 1/2002 | Chinn et al. |
| 2002/0019882 A1 | 2/2002 | Bokhani |
| 2002/0032677 A1 | 3/2002 | Morgenthaler et al. |
| 2002/0037010 A1 | 3/2002 | Yamauchi |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0103813 A1 | 8/2002 | Frigon |
| 2002/0107827 A1 | 8/2002 | Benitez-Jimenez et al. |
| 2002/0113812 A1 | 8/2002 | Walker et al. |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0152087 A1 | 10/2002 | Gonzalez |
| 2002/0157116 A1 | 10/2002 | Jasinschi |
| 2002/0163532 A1 | 11/2002 | Thomas |
| 2002/0174095 A1 | 11/2002 | Lulich et al. |

(56) References Cited

U.S. PATENT DOCUMENTS

| | | |
|---|---|---|
| 2002/0184505 A1 | 12/2002 | Mihcak |
| 2003/0005432 A1 | 1/2003 | Ellis et al. |
| 2003/0037010 A1 | 2/2003 | Schmelzer |
| 2003/0041047 A1 | 2/2003 | Chang |
| 2003/0089216 A1 | 5/2003 | Birmingham et al. |
| 2003/0093790 A1 | 5/2003 | Logan et al. |
| 2003/0101150 A1 | 5/2003 | Agnihotri |
| 2003/0105739 A1 | 6/2003 | Essafi et al. |
| 2003/0115191 A1 | 6/2003 | Copperman et al. |
| 2003/0184598 A1 | 10/2003 | Graham |
| 2003/0191776 A1 | 10/2003 | Obrador |
| 2003/0200217 A1 | 10/2003 | Ackerman |
| 2003/0217335 A1 | 11/2003 | Chung |
| 2003/0229531 A1 | 12/2003 | Heckerman et al. |
| 2004/0047461 A1 | 3/2004 | Weisman |
| 2004/0059736 A1 | 3/2004 | Willse |
| 2004/0091111 A1 | 5/2004 | Levy |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0119848 A1 | 6/2004 | Buehler |
| 2004/0128511 A1 | 7/2004 | Sun et al. |
| 2004/0153426 A1 | 8/2004 | Nugent |
| 2004/0230572 A1 | 11/2004 | Omoigui |
| 2004/0267774 A1 | 12/2004 | Lin |
| 2005/0010553 A1 | 1/2005 | Liu |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0238198 A1* | 10/2005 | Brown .................. G06K 9/4609 382/103 |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0020958 A1 | 1/2006 | Allamanche et al. |
| 2006/0033163 A1 | 2/2006 | Chen |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri |
| 2006/0248558 A1 | 11/2006 | Barton |
| 2006/0251292 A1 | 11/2006 | Gokturk |
| 2006/0251338 A1 | 11/2006 | Gokturk |
| 2006/0251339 A1 | 11/2006 | Gokturk |
| 2006/0253423 A1 | 11/2006 | McLane et al. |
| 2006/0288002 A1 | 12/2006 | Epstein |
| 2007/0022374 A1 | 1/2007 | Huang et al. |
| 2007/0038614 A1 | 2/2007 | Guha |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0156720 A1 | 7/2007 | Maren |
| 2007/0196013 A1 | 8/2007 | Li |
| 2007/0244902 A1 | 10/2007 | Seide et al. |
| 2007/0253594 A1 | 11/2007 | Lu et al. |
| 2007/0298152 A1 | 12/2007 | Baets |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0165861 A1 | 7/2008 | Wen |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0201326 A1 | 8/2008 | Cotter |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0253737 A1 | 10/2008 | Kimura |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0089251 A1 | 4/2009 | Johnston |
| 2009/0125544 A1 | 5/2009 | Brindley |
| 2009/0157575 A1 | 6/2009 | Schobben et al. |
| 2009/0172030 A1 | 7/2009 | Schiff et al. |
| 2009/0208106 A1 | 8/2009 | Dunlop et al. |
| 2009/0216761 A1 | 8/2009 | Raichelgauz |
| 2009/0220138 A1* | 9/2009 | Zhang ..................... G06T 7/12 382/132 |
| 2009/0245573 A1 | 10/2009 | Saptharishi et al. |
| 2009/0254572 A1 | 10/2009 | Redlich et al. |
| 2009/0278934 A1 | 11/2009 | Ecker |
| 2009/0282218 A1* | 11/2009 | Raichelgauz ....... G06F 17/3028 712/36 |
| 2009/0297048 A1 | 12/2009 | Slotine et al. |
| 2010/0042646 A1 | 2/2010 | Raichelqauz |
| 2010/0082684 A1 | 4/2010 | Churchill |
| 2010/0104184 A1 | 4/2010 | Bronstein |
| 2010/0111408 A1 | 5/2010 | Matsuhira |
| 2010/0125569 A1 | 5/2010 | Nair |
| 2010/0162405 A1 | 6/2010 | Cook |
| 2010/0198626 A1 | 8/2010 | Cho et al. |
| 2010/0284604 A1 | 11/2010 | Chrysanthakopoulos |
| 2010/0306193 A1 | 12/2010 | Pereira |
| 2010/0312736 A1 | 12/2010 | Kello |
| 2010/0318493 A1 | 12/2010 | Wessling |
| 2010/0318515 A1 | 12/2010 | Ramanathan et al. |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0038545 A1 | 2/2011 | Bober |
| 2011/0055585 A1 | 3/2011 | Lee |
| 2011/0164180 A1 | 7/2011 | Lee |
| 2011/0164810 A1 | 7/2011 | Zang et al. |
| 2011/0218946 A1 | 9/2011 | Stern et al. |
| 2011/0246566 A1 | 10/2011 | Kashef |
| 2011/0276680 A1 | 11/2011 | Rimon |
| 2011/0296315 A1 | 12/2011 | Lin et al. |
| 2012/0070078 A1 | 3/2012 | Sharma |
| 2012/0095850 A1 | 4/2012 | Hamel |
| 2012/0133497 A1 | 5/2012 | Sasaki |
| 2012/0167133 A1 | 6/2012 | Carroll |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0197857 A1 | 8/2012 | Huang |
| 2012/0221470 A1 | 8/2012 | Lyon |
| 2012/0227074 A1 | 9/2012 | Hill et al. |
| 2012/0229028 A1 | 9/2012 | Ackermann |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |

(56) References Cited

U.S. PATENT DOCUMENTS

| | | |
|---|---|---|
| 2013/0066856 A1 | 3/2013 | Ong et al. |
| 2013/0067364 A1 | 3/2013 | Berntson et al. |
| 2013/0089248 A1 | 4/2013 | Remiszewski |
| 2013/0103814 A1 | 4/2013 | Carrasco |
| 2013/0139151 A1 | 5/2013 | Criddle et al. |
| 2013/0159298 A1 | 6/2013 | Mason et al. |
| 2013/0191323 A1 | 7/2013 | Raichelgauz |
| 2013/0191823 A1 | 7/2013 | Davidson et al. |
| 2013/0211656 A1 | 8/2013 | An |
| 2013/0212493 A1 | 8/2013 | Krishnamurthy |
| 2013/0226820 A1 | 8/2013 | Sedota, Jr. |
| 2013/0226930 A1 | 8/2013 | Arngren |
| 2013/0283401 A1 | 10/2013 | Pabla et al. |
| 2014/0025692 A1 | 1/2014 | Pappas |
| 2014/0040232 A1 | 2/2014 | Raichelgauz |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta |
| 2014/0147829 A1 | 5/2014 | Jerauld |
| 2014/0149443 A1 | 5/2014 | Raichelgauz |
| 2014/0152698 A1 | 6/2014 | Kim et al. |
| 2014/0169681 A1 | 6/2014 | Drake |
| 2014/0176604 A1 | 6/2014 | Venkitaraman et al. |
| 2014/0188786 A1 | 7/2014 | Raichelgauz |
| 2014/0189536 A1 | 7/2014 | Lange |
| 2014/0193077 A1 | 7/2014 | Shiiyama et al. |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341471 A1 | 11/2014 | Ono |
| 2014/0341476 A1 | 11/2014 | Kulick et al. |
| 2014/0379477 A1 | 12/2014 | Sheinfeld |
| 2015/0009129 A1 | 1/2015 | Song |
| 2015/0033150 A1 | 1/2015 | Lee |
| 2015/0081725 A1 | 3/2015 | Ogawa |
| 2015/0100562 A1 | 4/2015 | Kohlmeier et al. |
| 2015/0117784 A1 | 4/2015 | Lin |
| 2015/0120627 A1 | 4/2015 | Hunzinger et al. |
| 2015/0134318 A1 | 5/2015 | Cuthbert |
| 2015/0134688 A1 | 5/2015 | Jing |
| 2015/0154189 A1 | 6/2015 | Raichelgauz et al. |
| 2015/0242689 A1 | 8/2015 | Mau |
| 2015/0254344 A1 | 9/2015 | Kulkarni et al. |
| 2015/0286742 A1 | 10/2015 | Zhang et al. |
| 2015/0317836 A1 | 11/2015 | Beaurepaire |
| 2015/0324356 A1 | 11/2015 | Gutierrez et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0171785 A1 | 6/2016 | Banatwala |
| 2016/0210525 A1 | 7/2016 | Yang |
| 2016/0221592 A1 | 8/2016 | Puttagunta |
| 2016/0306798 A1 | 10/2016 | Guo et al. |
| 2016/0307048 A1 | 10/2016 | Krishnamoorthy |
| 2016/0342683 A1 | 11/2016 | Kwon |
| 2016/0342863 A1 | 11/2016 | Kwon |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0066452 A1 | 3/2017 | Scofield |
| 2017/0072851 A1 | 3/2017 | Shenoy |
| 2017/0109602 A1 | 4/2017 | Kim |
| 2017/0150047 A1 | 5/2017 | Jung |
| 2017/0154241 A1 | 6/2017 | Shambik et al. |
| 2017/0255620 A1 | 9/2017 | Raichelgauz |
| 2017/0259819 A1 | 9/2017 | Takeda |
| 2017/0262437 A1 | 9/2017 | Raichelgauz |
| 2017/0277691 A1 | 9/2017 | Agarwal |
| 2017/0323568 A1 | 11/2017 | Inoue |
| 2018/0081368 A1 | 3/2018 | Watanabe |
| 2018/0101177 A1 | 4/2018 | Cohen |
| 2018/0157916 A1 | 6/2018 | Doumbouya |
| 2018/0158323 A1 | 6/2018 | Takenaka |
| 2018/0204111 A1 | 7/2018 | Zadeh |
| 2018/0286239 A1 | 10/2018 | Kaloyeros |
| 2018/0300654 A1 | 10/2018 | Prasad |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0061784 A1 | 2/2019 | Koehler |
| 2019/0065951 A1 | 2/2019 | Luo |
| 2019/0188501 A1 | 6/2019 | Ryu |
| 2019/0220011 A1 | 7/2019 | Della Penna |
| 2019/0236954 A1 | 8/2019 | Komura |
| 2019/0317513 A1 | 10/2019 | Zhang |
| 2019/0320512 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2019/0392710 A1 | 12/2019 | Kapoor |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

OTHER PUBLICATIONS

Odinaev et al, "Cliques in Neural Ensembles as Perception Carriers", Technion—Institute of Technology, 2006 International Joint Conference on neural Networks, Canada, 2006, pp. 285-292.

Santos et al., "SCORM-MPEG: an Ontology of Interoperable Metadata for multimediaand E-Learning", 23rd International Conference on Software, Telecommunications and Computer Networks (SoftCom), 2015, pp. 224-228.

"Computer Vision Demonstration Website", Electronics and Computer Science, University of Southampton, 2005, USA.

Boari et al, "Adaptive Routing for Dynamic Applications in Massively Parallel Architectures", 1995 IEEE, Spring 1995, pp. 1-14.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al, "Feed-forward Echo State Networks", Proceedings of International Joint Conference on Neural Networks, Montreal, Canada, Jul. 31-Aug. 4, 2005, pp. 1-4.

Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Garcia, "Solving the Weighted Region Least Cost Path Problem Using Transputers", Naval Postgraduate School, Monterey, California, Dec. 1989.

Guo et al, AdOn: An Intelligent Overlay Video Advertising System (Year: 2009).

Hogue, "Tree Pattern Inference and Matching for Wrapper Induction on the World Wide Web", Master's Thesis, Massachusetts Institute of Technology, Jun. 2004, pp. 1-106.

Howlett et al, "A Multi-Computer Neural Network Architecture in a Virtual Sensor System Application", International Journal of knowledge-based intelligent engineering systems, 4 (2). pp. 86-93, 133N 1327-2314.

(56) References Cited

OTHER PUBLICATIONS

Hua et al., "Robust Video Signature Based on Ordinal Measure", Image Processing, 2004, 2004 International Conference on Image Processing (ICIP), vol. 1, IEEE, pp. 685-688, 2004.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Mcnamara et al., "Diversity Decay in opportunistic Content Sharing Systems", 2011 IEEE International Symposium on a World of Wireless, Mobile and Multimedia Networks, pp. 1-3.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Queluz, "Content-Based Integrity Protection of Digital Images", SPIE Conf. on Security and Watermarking of Multimedia Contents, San Jose, Jan. 1999, pp. 85-93.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Stolberg et al. ("Hibrid-SOC: A Multi-Core SOC Architecture for Multimedia Signal Processing" 2003).
Stolberg et al, "Hibrid-SOC: A Mul ti-Core SOC Architecture for Mul timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996 PDP '96, pp. 274-281.
Vallet et al ("Personalized Content Retrieval in Context Using Ontological Knowledge" Mar. 2007) (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.

Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
Ma Et El. ("Semantics modeling based image retrieval system using neural networks" 2005 (Year: 2005).
Jasinschi et al., A Probabilistic Layered Framework for Integrating Multimedia Content and Context Information, 2002, IEEE, p. 2057-2060. (Year: 2002).
Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).
Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).
Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).
Lai, Wei-Sheng, et al. "Deep laplacian pyramid networks for fast and accurate super-resolution." Proceedings of the IEEE conference on computer vision and pattern recognition. 2017 (Year: 2017).
Ren, Shaoqing, et al. "Faster r-cnn: Towards real-time object detection with region proposal networks." IEEE transactions on pattern analysis and machine intelligence 39.6 (2016): 1137-1149 (Year: 2016).
Felzenszwalb, Pedro F., et al. "Object detection with discriminatively trained part-based models." IEEE transactions on pattern analysis and machine intelligence 32.9 (2009): 1627-1645. (Year: 2009).
Lin, Tsung-Yi, et al. "Feature pyramid networks for object detection." Proceedings of the IEEE conference on computer vision and pattern recognition. 2017. (Year: 2017).
Jasinschi, Radu S., et al. "A probabilistic layered framework for integrating multimedia content and context information." 2002 IEEE International Conference on Acoustics, Speech, and Signal Processing. vol. 2. IEEE, 2002. (Year: 2002).
Gull et al., "A Clustering Technique to Rise Up the Marketing Tactics by Looking Out the Key Users Taking Facebook as a Case study", 2014, IEEE International Advance Computing Conference (IACC), 579-585 (Year: 2014).
Zhang et al., "Dynamic Estimation of Family Relations from Photos", 2011, Advances in Multimedia Modeling. MMM 2011, pp. 65-76 (Year: 2011).
Chen, "CLUE: Cluster-Based Retrieval of Images by Unsupervised Learning", IEEE, vol. 14 pp. 1187-1201 (Year: 2005).
Troung, "Casis: A System for Concept-Aware Social Image Search", 2012 (Year: 2012).
Cody, W.F et al. (Mar. 1995). "Querying multimedia data from multiple repositories by content: the Garlic project". In Working Conference on Visual Database Systems (pp. 17-35). Springer, Boston, MA. (Year: 1995).
Schneider, J.M. (Oct. 2015). "New approaches to interactive multimedia content retrieval from different sources". Diss. Universidad Carlos Ill de Madrid. 274 pages. (Year: 2015).
Yong, N .S. (2008). "Combining multi modal external resources for event-based news video retrieval and question answering". PhD Diss, National University Singapore. 140 pages. (Year: 2008.
Kennedy, L. et al. (2008). "Query-adaptive fusion for multimodal search". Proceedings of the IEEE, 96(4), 567-588. (Year: 2008).
Sang Hyun Joo, "Real time traversability analysis to enhance rough terrain navigation for an 6×6 autonomous vehicle", 2013 (Year: 2013).

\* cited by examiner

SYSTEM AND METHOD FOR DETERMINING COMMON PATTERNS IN MULTIMEDIA CONTENT ELEMENTS BASED ON KEY POINTS

CROSS-REFERENCE TO RELATED APPLICATIONS

This application claims the benefit of U.S. Provisional Application No. 62/307,511 filed on Mar. 13, 2016. This application is also a continuation-in-part of U.S. patent application Ser. No. 15/336,218 filed on Oct. 27, 2016, now pending, which claims the benefit of U.S. Provisional Application No. 62/267,398 filed on Dec. 15, 2015. The contents of the above-mentioned applications are hereby incorporated by reference.

TECHNICAL FIELD

The present disclosure relates generally to analyzing multimedia content, and particularly to utilization of key points in multimedia data elements.

BACKGROUND

With the abundance of multimedia data made available through various means in general and the Internet and world-wide web (WWW) in particular, there is a need for effective ways of analyzing and identifying such multimedia data. Such multimedia data may include, for example, images, graphics, video streams, video clips, video frames, photographs, images of signals, and the like.

Analyzing such multimedia content may be challenging at best due to the huge amount of information that needs to be examined. Helpful and vital data analysis becomes time intensive due to the amount of data that must be processed. As a result, data analysis may be a low priority or ignored entirely.

Even identifying multimedia content elements included in multimedia content is a challenging problem. Existing solutions may include processing, analyzing, and understanding the multimedia content based on one or more decisions. A theme of development for many such existing solutions has been to replicate the abilities of human vision by electronically perceiving and recognizing multimedia content items.

The existing solutions are limited in the ability to identify multimedia content elements that are received for the first time. In particular, many existing solutions require comparing portions of multimedia content to known multimedia content elements to identify any matching multimedia content elements. Thus, unknown multimedia content elements or multimedia content elements that have otherwise never been received before may not be successfully recognized.

Additionally, existing solutions are often highly sensitive to changes in the received multimedia content elements. Consequently, minor changes in the multimedia content due to, for example, differences during capturing, may result in otherwise identical multimedia content elements being unrecognizable. For example, taking pictures of a car at different angles (e.g., one from the rear right side and another from the front left side) may result in the car being unrecognizable by existing solutions for one or more of the pictures.

Other existing solutions rely on metadata to identify multimedia content elements. Use of such metadata typically relies on information from, e.g., users. Thus, the metadata may not be sufficiently defined to fully describe the multimedia content and, as a result, may not capture all aspects of the multimedia content. For example, a picture of a car may be associated with metadata representing a model of the car, but other pictures of the car may not be associated with metadata designating the owners.

Further, the existing solutions often include analyzing each and every pixel of the multimedia content and matching those pixels to pixels in a database. This analysis consumes a significant amount of computing resources. Further, such a complete analysis may be unnecessary, as portions of multimedia content may not contribute to the identification of elements therein. For example, images may include black edges which are not useful for identification. As another example, text that is repeated throughout an image may only be useful to identification once, and subsequent analysis of the text is not useful.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for determining common patterns in multimedia data elements (MMDEs) based on key points. The method comprises: identifying a plurality of candidate key points in each of the plurality of MMDEs, wherein a size of each candidate key point is equal to a predetermined size and a scale of each candidate key point is equal to a predetermined scale; analyzing the identified candidate key points to determine a set of properties for each candidate key point; comparing the sets of properties of the plurality of candidate key points of each MMDE; selecting, for each MMDE, a plurality of key points from among the candidate key points based on the comparison; generating, based on the plurality of key points for each MMDE, a signature for the MMDE; and comparing the signatures of the plurality of MMDEs to output at least one common pattern among the plurality of MMDEs.

Certain embodiments disclosed herein also include a non-transitory computer readable medium having stored thereon instructions for causing one or more processing units to execute a method, the method comprising: identifying a plurality of candidate key points in each of the plurality of MMDEs, wherein a size of each candidate key point is equal to a predetermined size and a scale of each candidate key point is equal to a predetermined scale; analyzing the identified candidate key points to determine a set of properties for each candidate key point; comparing the sets of properties of the plurality of candidate key points of each MMDE; selecting, for each MMDE, a plurality of key points from among the candidate key points based on the comparison; generating, based on the plurality of key points for each MMDE, a signature for the MMDE; and comparing the signatures of the plurality of MMDEs to output at least one common pattern among the plurality of MMDEs.

Certain embodiments disclosed herein also include a system for determining common patterns in multimedia data elements (MMDEs) based on key points. The system comprises: a processing circuitry; and a memory, the memory containing instructions that, when executed by the processing circuitry, configure the system to: identify a plurality of candidate key points in each of the plurality of MMDEs, wherein a size of each candidate key point is equal to a predetermined size and a scale of each candidate key point is equal to a predetermined scale; analyze the identified candidate key points to determine a set of properties for each candidate key point; compare the sets of properties of the plurality of candidate key points of each MMDE; select, for each MMDE, a plurality of key points from among the candidate key points based on the comparison; generate, based on the plurality of key points for each MMDE, a signature for the MMDE; and compare the signatures of the plurality of MMDEs to output at least one common pattern among the plurality of MMDEs.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
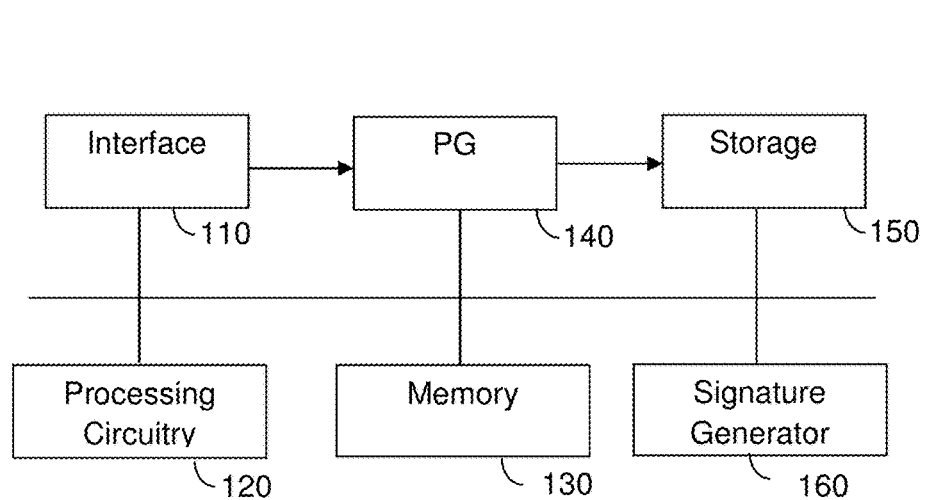
FIG. 1 is a schematic diagram of a system for identifying key points in multimedia data elements according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for determining common patterns in multimedia data elements based on key points in the multimedia data elements. The identified key points may be utilized to identify multimedia content elements in the multimedia data elements. A multimedia data element is analyzed to identify candidate key points. The candidate key points are analyzed to determine a set of properties for each candidate key point. Key points are selected based on the determined sets of properties. Signatures are generated for the selected key points. In some embodiments, the generated signatures may be clustered into a cluster representing the multimedia data element. The signatures or cluster of the multimedia data element may be compared to signatures of other multimedia data elements to output common patterns among the multimedia data elements.

FIG. 1 shows an example schematic diagram of a system 100 for determining common patterns based on key points in multimedia data elements (MMDEs) according to an embodiment. The system 100 includes an interface 110, a processing circuitry 120, a memory 130, a properties generator (PG) 140, a storage 150, and a signature generator 160. The memory 130 may be volatile (e.g., RAM, etc.), non-volatile (e.g., ROM, flash memory, etc.), or a combination thereof.

Key points are areas within an MMDE of predetermined size and scale that are determined by the system 100 to be the best representations of elements shown in the MMDE. A key point is an area of interest within the MMDE. Key points can be utilized to allow for efficient identification of elements shown in the MMDE by, for example, computer vision systems. Further, the key points may be utilized as representative portions of a MMDE for generating signatures thereto such that the signatures are only generated for the representative portions, thereby reducing use of computing resources and improving accuracy during signature generation.

As an example, for a picture of a cat lying on grass, portions of the picture in which the cat or part of the cat is shown may be considered of stronger interest than portions in which only grass is shown. Thus, the area in the picture showing the cat is a key point. As another example, for a picture of a sunset reflected in the ocean, portions of the picture in which both the sun and ocean appear may be considered key points, while portions featuring only the sun or the ocean may not be considered key points.

The key points may be determined based on at least one candidate key point identified in an MMDE. In an embodiment, the identified candidate key points may be selected randomly from among points in the MMDE identified during the analysis. In another embodiment, the candidate key points may be identified based on at least one predetermined key point representation rule. As a non-limiting example, a key point representation rule may include a distance threshold such that only one of any two points having a distance between the two points less than the distance threshold are is selected as a candidate key point. A key point representation rule is described herein below.

MMDEs may be received through the interface 110. The interface 110 may be, but is not limited to, a network interface. As an example, the interface 110 may be a network interface for receiving MMDEs from one or more data sources (not shown) over a network (not shown). The data sources may be, for example, servers (e.g., web servers) or other sources of data including MMDEs. Each MMDE may be, but is not limited to, an image, a graphic, a video stream, a video clip, a video frame, a photograph, and an image of signals (e.g., spectrograms, phasograms, scalograms, etc.), combinations thereof, and portions thereof.

The properties generator 140 is configured to generate a set of properties for each candidate key point. The properties are scalable measures enabling evaluation of each candidate key point as well as determination of key points from among the candidate key points. The properties may include, but are not limited to, a location of a candidate key point within an MMDE, a rotation of a candidate key point within the MMDE, a size of the candidate key point relative to the MMDE, a pixilation of the candidate key point, combinations thereof, and the like. In an embodiment, the properties generator 140 may be further configured to identify benchmarking metrics utilized for determining properties of the candidate key points. For example, for an image, benchmarking metrics may include a white color against which other colors in the image may be compared. The benchmarking metrics utilized and properties determined may be based on a type of the MMDE. For example, metrics for an image may differ from metrics for audio.

The location of the candidate key point may be represented in an XY diagram, wherein the point (0,0) represents one or more edges of the MMDE. The size of a candidate key point is a size of a multimedia content element. The rotation of the candidate key point is an angle at which a multimedia content element located at the candidate key point is tilted with respect to a baseline and may be determined respective of, for example, 8 different benchmarking metrics representing different rotations. The baseline may be further determined based on other multimedia content elements of the MMDE. The pixilation may be represented, e.g., in two rectangles (e.g., a 6×3 black rectangle and a 3×6 white rectangle).

The properties generator 140 may be further configured to store the generated properties in the storage 150. The properties generator 140 is described further herein below with respect to FIG. 2.

The signature generator 160 is configured to generate signatures for MMDEs or portions thereof. Each signature is a distinct numeric representation of an MMDE or portion thereof such that different signatures represent different features of MMDEs or portions thereof, which may be robust to noise and distortion. The signature generator 160 may be further configured to compare a plurality of signatures. The comparison may include, but is not limited to, mapping a signature vector representation into vector space, using Euclidean distance as a first approximation, and the like. This comparison may be assisted by embedding algorithms which reduce the number of dimensions in the vector space. In an embodiment, the signature generator 160 may be configured to generate signatures as described further herein below with respect to FIGS. 13 and 14.

The processing circuitry 120 is configured to receive one or more MMDEs through the interface 110 and to determine candidate key points for each of the received MMDEs. The processing circuitry 120 is further configured to cause the properties generator 140 to generate the set of properties for each determined candidate key point and to retrieve the generated sets of properties. Based on the retrieved properties, the processing circuitry 120 is configured to identify key points from among the candidate key points.

The processing circuitry 120 is typically coupled to the memory 130. The processing circuitry 120 may comprise or be a component of a processor (not shown) or an array of processors coupled to the memory 130. The memory 130 contains instructions that can be executed by the processing circuitry 120. The instructions, when executed by the processing circuitry 120, cause the processing circuitry 120 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 120 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

In another embodiment, the processing circuitry 120 can be realized as an array of computational cores, each core having properties that are at least partly statistically independent from other cores of the plurality of computational cores. The array of computational cores may be initialized by the signature generator 160 to generate signatures. Such cores are generated or otherwise configured to obtain maximal independence, i.e., the projection from a signal space should generate a maximal pair-wise distance between any two cores' projections into a high-dimensional space. Further, the cores are optimally designed for the type of signals, i.e., the cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power. In addition, the computational cores are optimally designed with regard to invariance to a set of signal distortions, of interest in relevant applications. A detailed description of processes for generating, configuring, and operating any array of computational cores is discussed in more detail in U.S. Pat. No. 8,655,801 assigned to the common assignee, which is hereby incorporated by reference for all the useful information it contains.

It should be understood that the embodiments disclosed herein are not limited to the specific architecture illustrated in FIG. 1, and that other architectures may be equally used without departing from the scope of the disclosed embodiments. Moreover, in an embodiment, there may be a plurality of systems 100 operating as described hereinabove and configured to either have one as a standby, to share the load between them, or to split the functions between them.

Figure 2:
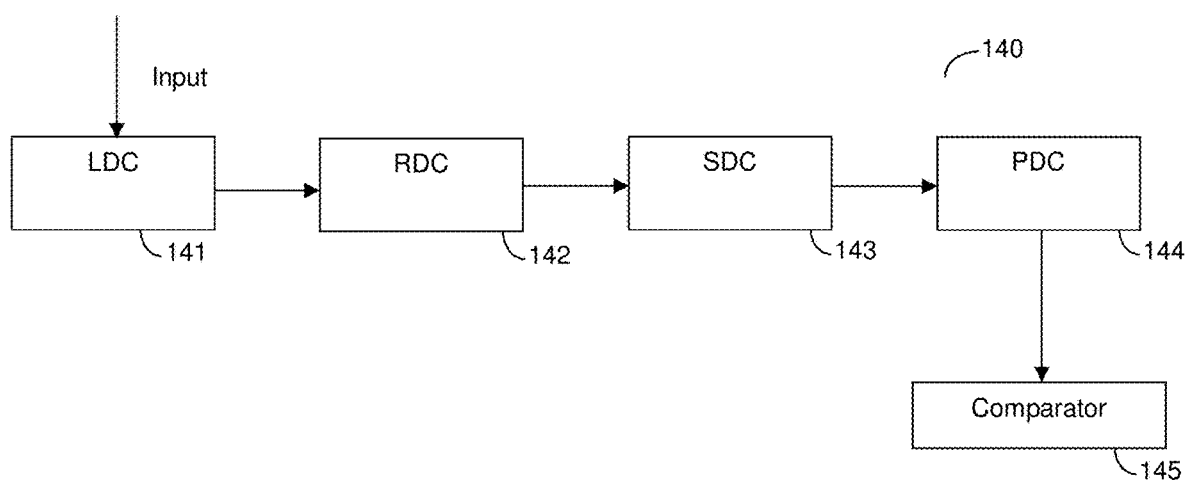
FIG. 2 is a schematic diagram of a properties generation unit according to an embodiment.

FIG. 2 is an example flow diagram illustrating image processing by the properties generator 140 according to an embodiment. In the example embodiment shown in FIG. 2, the properties generator 140 includes a location determination circuit (LDC) 141, a rotation determination circuit (RDC) 142, a size determination circuit (SDC) 143, and a pixilation determination circuit (PDC) 144. In an optional implementation, the properties generator 140 also includes a comparator 145. Further, in the example embodiment shown in FIG. 2, a MMDE is processed in the following order: by the location determination circuit 141, by the rotation determination circuit 142, by the size determination circuit 143, by the pixilation determination circuit 144, and by the comparator 145.

The location determination circuit 141 is configured to determine a location of a candidate key point in a MMDE. The location may be relative to the MMDE. To this end, when the MMDE is an image, the location may be expressed as a pair of, e.g., X and Y coordinates (X,Y). The origin (0,0) may be any point in the MMDE. As a non-limiting example, the origin may be at the bottom left corner of the MMDE such that points in the MMDE are at coordinates (0,0), (100,150), and any coordinates in between such as, but not limited to, (0,90), (50,0), (75,75), (99,149), (80,120), and so on. When the MMDE is audio, the location may be expressed as a moment or period of time in the audio file. For example, for an audio clip that is 5 minutes (300 seconds) long, the location may be, but is not limited to, 0 seconds (start), 30 seconds, 100 seconds, 267 seconds, 150.2 seconds, 300 seconds (end), and the like.

The rotation determination circuit 142 is configured to determine a rotation of candidate key points in MMDEs. As a non-limiting example, the rotation determination circuit 142 is configured to identify edges of MMDEs, thereby enabling matching of the rotation of the MMDEs based on the respective edges thereof. The size determination circuit 143 is configured to determine a size of candidate key points in MMDEs. The pixilation determination circuit is configured to 144 determines a pixilation of candidate key points in MMDEs. As a non-limiting example, in an image of a couple hugging in front of the Eiffel tower, the pixilation of the portion of the image showing the couple is higher than the pixilation of the portion of the image showing the Eiffel tower in the background. Each of the location determination circuit 141, the rotation determination circuit 142, the size determination circuit is configured to 143, and the pixilation determination circuit 144 may determine its respective properties based on characteristics of elements in the MMDE. To this end, each circuit, 142, 143, or 144 may be configured to identify at least one benchmarking metric based on the MMDE and to compare elements in the MMDE to the benchmarking metric.

Each benchmarking metric may be a metric representing a particular rotation, size, or pixilation of an MMDE, and may be utilized as a point of comparison by, for example, the rotation determination circuit 142, the size determination circuit 143, or the pixilation determination circuit 144, respectively. To this end, each of the rotation, size, and pixilation of a MMDE may be determined relative to at least one corresponding benchmarking metric. As a non-limiting example, if a text element in an image is identified as being in a particular character set (e.g., letters of the English alphabet), the rotation determination circuit 142 may be configured to determine a rotation of the text element with respect to a benchmarking metric text element in the same character set (e.g., a horizontally oriented text element using English alphabet letters).

In an embodiment, the properties generator 140 may include a comparison unit 145. The comparison unit 145 compares a set of properties of each candidate key point. The comparison may be utilized to determine whether a candidate key point should be selected as a key point. To this end, the comparator 145 may be configured to compare scores of properties of the same type (e.g., scores for locations of different candidate key points, scores for rotations of different candidate key points, and the like).

In an embodiment, each, some, or all of the location determination circuit 141, the rotation determination circuit 142, the size determination circuit 143, the pixilation determination circuit (PDC) 144, and the comparator 145 may comprise or be a component of a processor (not shown) or an array of processors. Examples for such processor or processors are provided above.

It should be noted that the flow diagram shown in FIG. 2 is merely an example and does not limit any of the disclosed embodiments. In particular, a MMDE may be processed by any of the location determination circuit 141, the rotation determination circuit 142, the size determination circuit 143, and the pixilation determination circuit 144, either in series or in parallel, and may be processed by each circuit in any order. As a non-limiting example, the MMDE may be processed by the location determination circuit 141, the rotation determination circuit 142, the size determination circuit 143, and the pixilation determination circuit 144 simultaneously. As another non-limiting example, the MMDE may be processed by the circuits in the following order: by the rotation determination circuit 142, by the pixilation determination circuit 144, by the size determination circuit 143, and by the location determination circuit 141. Additionally, other circuits for determining properties of MMDEs (not shown), such as a color determination circuit, may be equally used in addition to or instead of any of the circuits 141, 142, 143, or 144.

Figure 3:
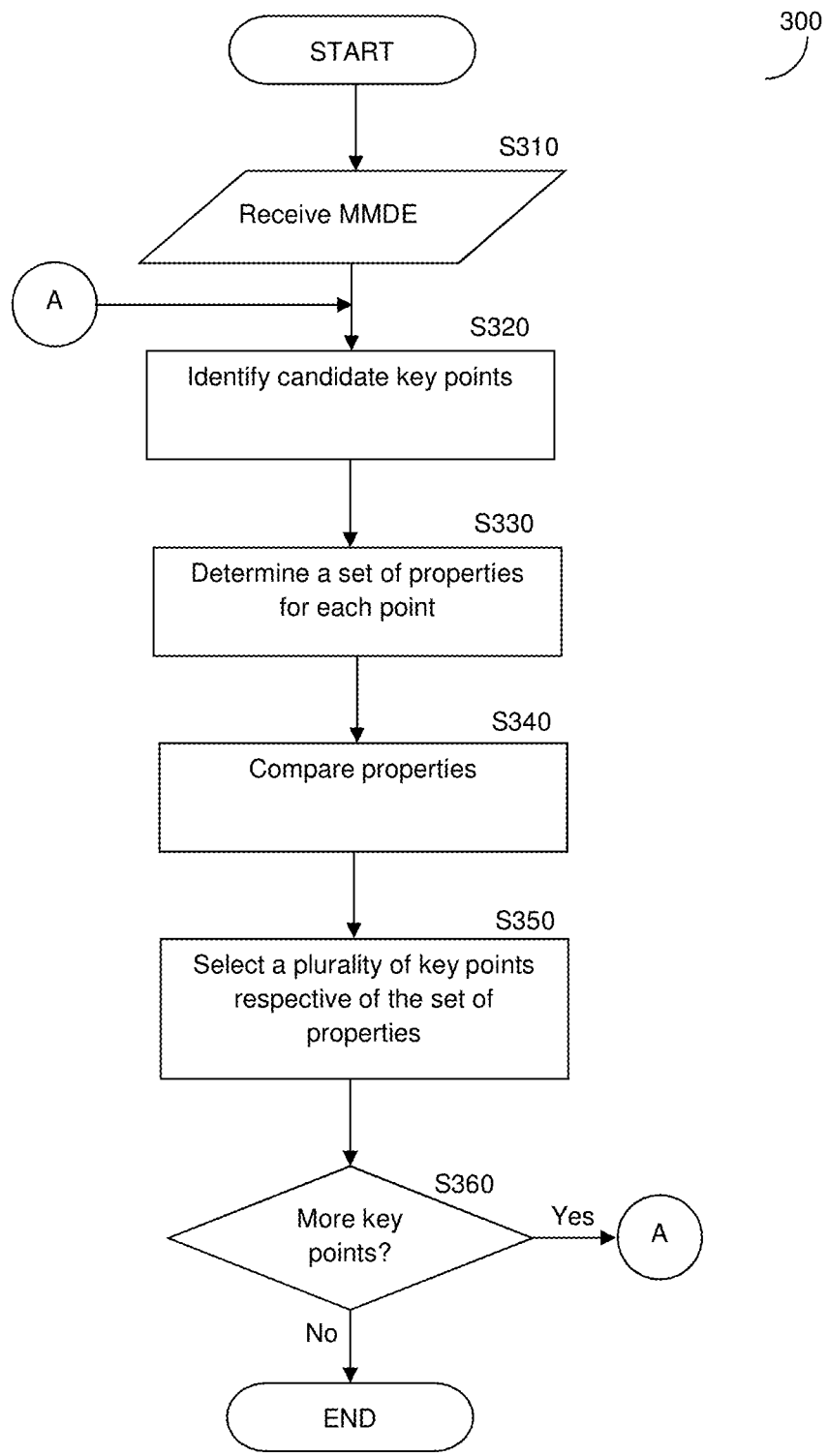
FIG. 3 is a flowchart illustrating a method for identifying key points in multimedia data elements according to an embodiment.

FIG. 3 is an example flowchart 300 illustrating a method for identifying key points in a MMDE according to an embodiment. In an embodiment, the method may be performed by the system 100.

At S310, a MMDE is received. The MMDE may be received via an interface (e.g., the interface 110).

At S320 the MMDE is analyzed to identify candidate key points. In an embodiment, S320 may include image-based recognition of the MMDE. In a further embodiment, the image-based recognition may begin at the edges of the MMDE and continue to the center. As an example, if the MMDE is an image, the analysis may begin at the outermost points in the image. As another example, if the MMDE is audio, the analysis may begin at the beginning and end times for the audio.

In an embodiment, the identified candidate key points may be selected randomly from among points in the MMDE identified during the analysis. In another embodiment, the candidate key points may be identified based on at least one predetermined key point representation rule. As an example, a key point representation rule may include a distance threshold (e.g., a distance between points in an image or video, a length of time in audio, etc.). If two points in an MMDE are separated by a distance less than the distance threshold, only one of the points may be identified as a candidate key point.

At S330, a set of properties is determined for each identified candidate key point. Determination of properties for candidate key points is described further herein below with respect to FIG. 4.

At S340, the properties for each candidate key point are compared. In an embodiment, comparing the properties further includes determining a property score for each property of each candidate key point. The property scores may be determined based on comparison of characteristics of each property such as, but not limited to, intensity, distance from a center point of the MMDE, color, angle of rotation, a combination thereof, and the like. The property scores may be determined further based on benchmarking metrics for such characteristics. In an embodiment, higher property scores indicating a greater likely significance of the candidate key point. As an example, the location scores for a particular candidate point may be 3, 7, and 8, respectively, with 1 representing the lowest likelihood of significance (e.g., toward the outer edges of the MMDE) and 10 representing the highest likelihood of significance (e.g., closest to the center of the MMDE).

At S350, key points are selected from among the identified candidate key points. The key points may be selected based on the determined sets of properties via, e.g., comparison of the properties' respective scores. Selecting key points among candidate key points is described further herein below with respect to FIG. 5.

At optional S360, it is checked whether additional key points are required and, if so, execution continues with S320; otherwise, execution terminates. In an embodiment, upon selecting a key point in a particular area of the MMDE, additional key points may be checked for within, or in proximity to, the area of the key point.

Figure 4:
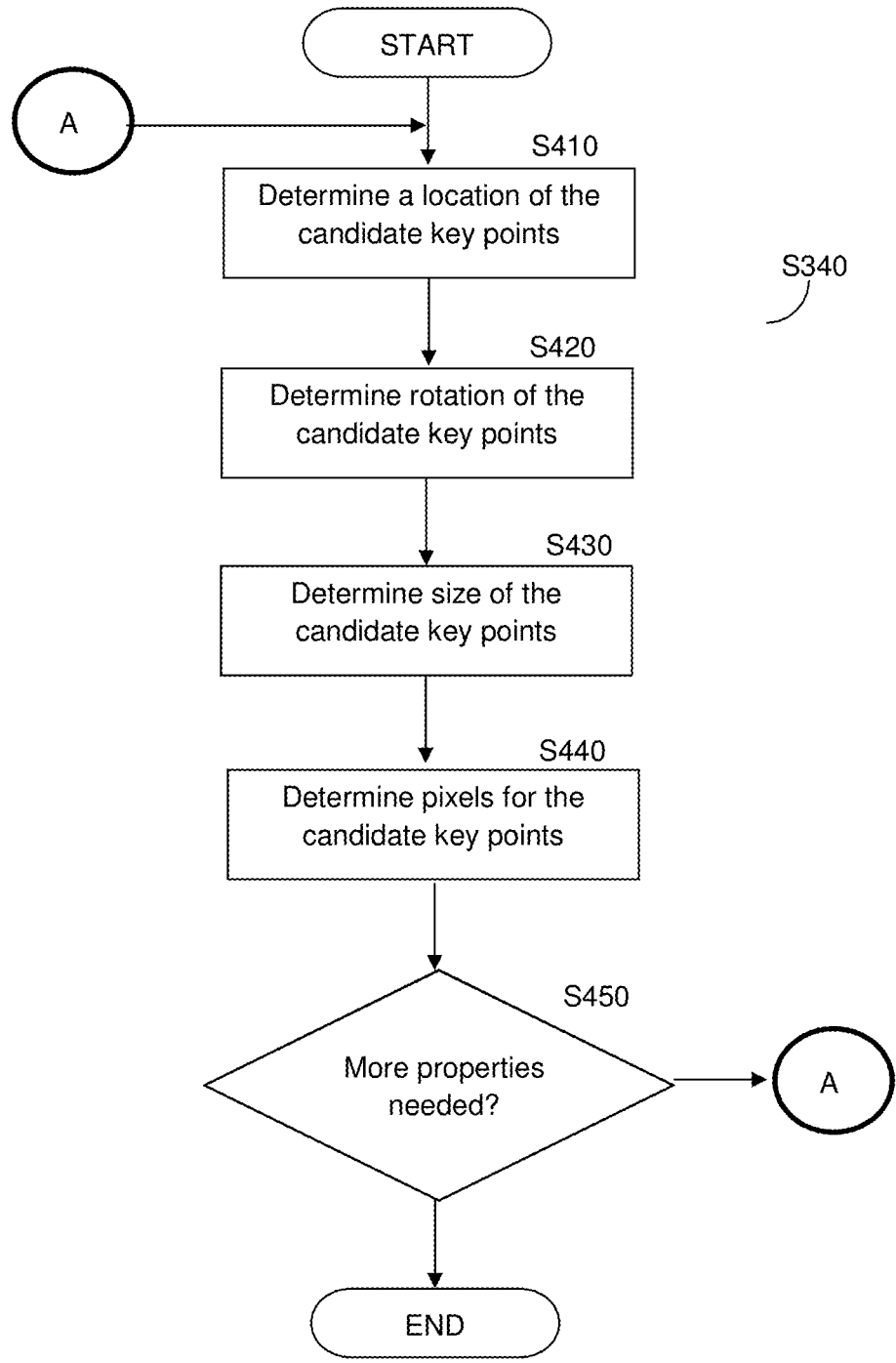
FIG. 4 is a flowchart illustrating a method for generating properties based on candidate key points according to an embodiment.

FIG. 4 is an example flowchart S340 illustrating a method for determining a set of properties for candidate key points in an MMDE according to an embodiment. In an embodiment, each of the properties may be determined by comparing benchmarking metrics to one or more characteristics of the candidate key point.

At S410, a location of a candidate key point is determined. The location of the candidate key point may be determined by identifying a center point of the MMDE and determining a distance from the center point to the candidate key point. At S420, a rotation of the candidate key point may be determined. The rotation may be determined based on edges identified in the MMDE. At S430, a size of the candidate key point may be determined. At S440, a pixilation of the candidate key point may be determined.

At S450, it may be determined whether properties of additional candidate key points are required and, if so, execution continues with S410; otherwise execution terminates. In an embodiment, the determination may be based on an MMDE identification rule. The MMDE identification rule indicates at least one condition for successful identification of multimedia content elements and may be based on, but not limited to, an event (e.g., identification of a concept related to the MMDE), a threshold (e.g., a number of sets of properties for candidate key points), a combination thereof, and the like. To this end, in an embodiment in which identification of a concept related to the MMDE is indicated by the MMDE identification rule, S450 may further include determining whether a concept can be identified based on the properties determined thus far.

It should be noted that FIG. 4 is described herein above with respect to location, rotation, size, and pixilation properties merely for simplicity purposes and without limitation on the disclosed embodiments. More, fewer, or other properties may be utilized without departing from the scope of the disclosure. As an example, a color property for an image may also be determined. As another example, a volume property for an audio file may be determined, and the rotation and pixilation properties may not be determined for the audio file.

Figure 5:
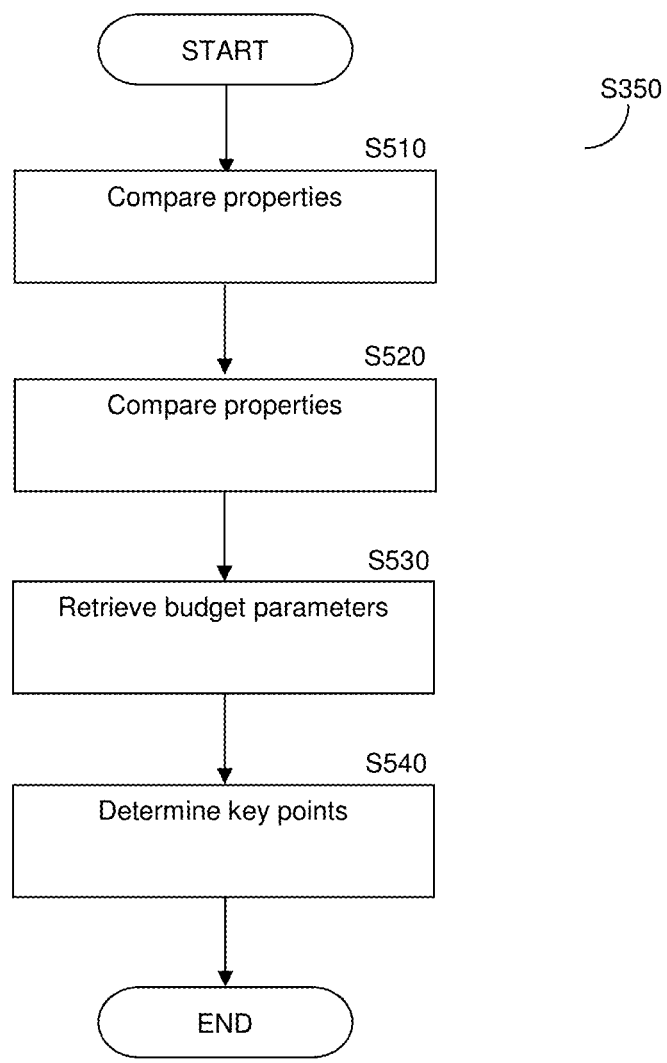
FIG. 5 is a flow chart illustrating a method for selecting key points from among candidate key points according to an embodiment.

FIG. 5 is an example flowchart S350 illustrating a method for selecting key points in a MMDE according to an embodiment.

At S510, sets of properties of candidate key points in the MMDE are obtained. The sets of properties for each candidate key point may include the properties determined as described herein above with respect to FIG. 4.

At S520, the sets of properties are compared to identify relatively high sets of properties. The relatively high sets of properties are identified to determine the most descriptive candidate key points. In an embodiment, S520 includes determining a property score for each property. Each property score may be determined based on relative values for properties of the candidate key points. In a further embodiment, S520 may also include determining an average property score for properties of each set of properties. In yet a further embodiment, relatively high sets of properties may be sets of properties having average property scores above a predetermined threshold.

At optional S530, at least one budget parameter may be retrieved. The budget parameter is a quantitative limitation on the maximum amount of key points that may be selected for the MMDE and is typically utilized to ensure efficient key point identification by restricting the number of key points that need to be identified, thereby conserving computing resources. The budget may be the same for all MMDEs, may differ for different types of MMDEs, and the like. In an embodiment, the budget may be retrieved from the storage unit 150.

At S540, key points to be selected are determined based on the comparison. The number of key points determined may be limited based on the budget.

Figure 6:
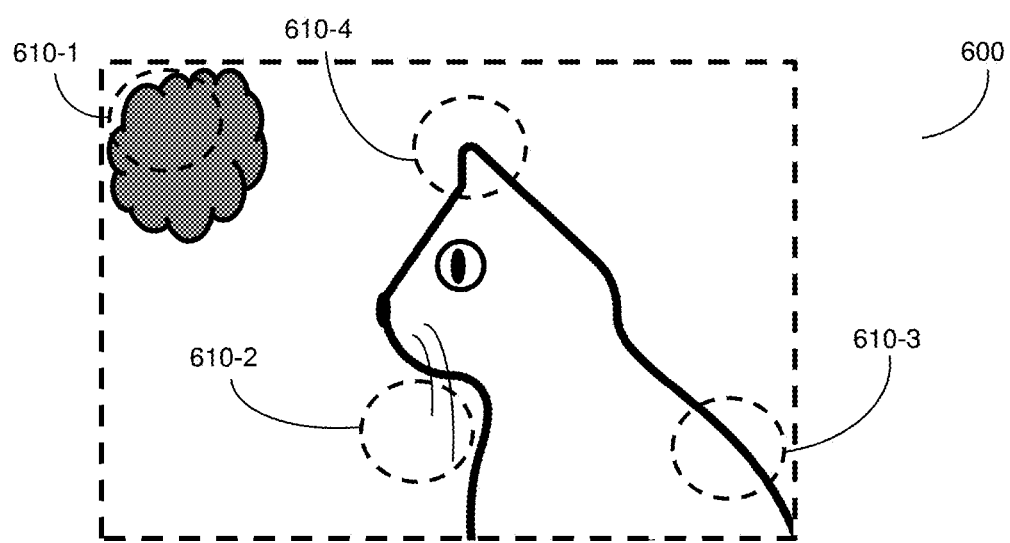
FIG. 6 is an example simulation of identifying key points in an image multimedia data element.

FIG. 6 is an example simulation of a selection of candidate key points in a MMDE. In the example simulation of FIG. 6, an image 600 includes a cat. The image 600 may be received via an interface and analyzed. Based on the analysis, candidate key points 610-1 through 610-4 are identified. A set of properties is generated for each of the candidate key points 610. The sets of properties are compared. For example, the location property of candidate key point 610-1 is relatively low as compared to candidate key point 610-3 because it is closer to the center of the image 600. Additionally, the pixilation property of candidate key point 610-2 may be relatively low as compared to candidate key point 610-4.

Figure 7:
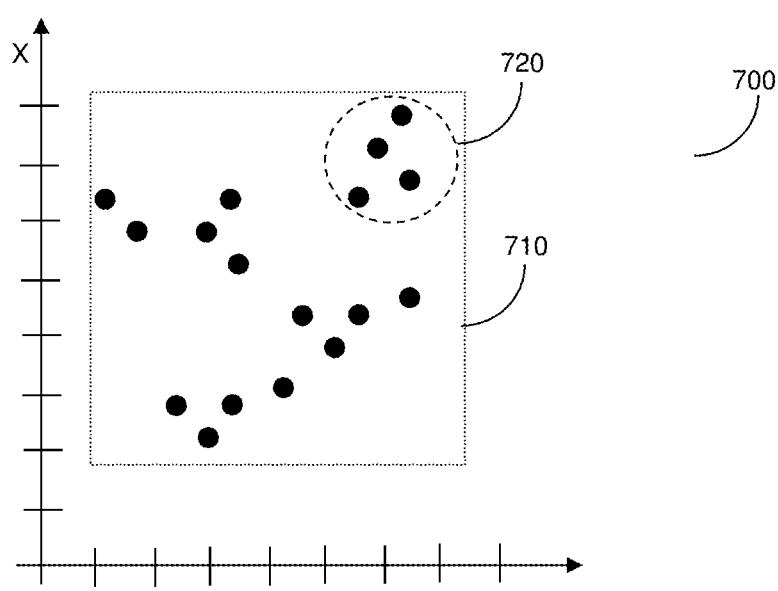
FIG. 7 is an example data plot utilized to illustrate determining a location property of a candidate key point.

FIG. 7 is an example data plot 700 utilized to illustrate determining a location property of a candidate key point. The example data plot 700 includes a set of data points 710 and a subset of data points 720 among the set of data points 710. Location properties are determined for candidate key points. The location properties may be displayed in the data plot 700 as an XY graph where the data point (0,0) represents a point on an edge of a MMDE and where the points farthest from the data point (0,0) represent the points closest to the center of the MMDE. In the example data plot 700, each point (x,y) represents, e.g., a horizontal and vertical distance, respectively, of the candidate key point to the center of the MMDE when the MMDE is an image. In other example data plots, each point (x,y) may represent, e.g., a horizontal and vertical distance, respectively, of the candidate key point to one or more of the edges of the image MMDE. For other types of multimedia content elements (e.g., video, audio, etc.), each of the X-axis and the Y-axis may represent metrics such as, but not limited to, amount of time from half of the total time of the audio or video, a horizontal or vertical distance to or from a center of an image-based portion of the video, a distance of a line to or from the center of the image-based portion of the video, and the like.

The candidate key points with the strongest responses (i.e., location properties) may be selected. The strongest response key points may be determined by comparing the location properties among the candidate key points 710 and assigning a location score to each of the candidate key points 710. As an example, the strongest response candidate key points are associated with points of the subset 720.

Figure 8:
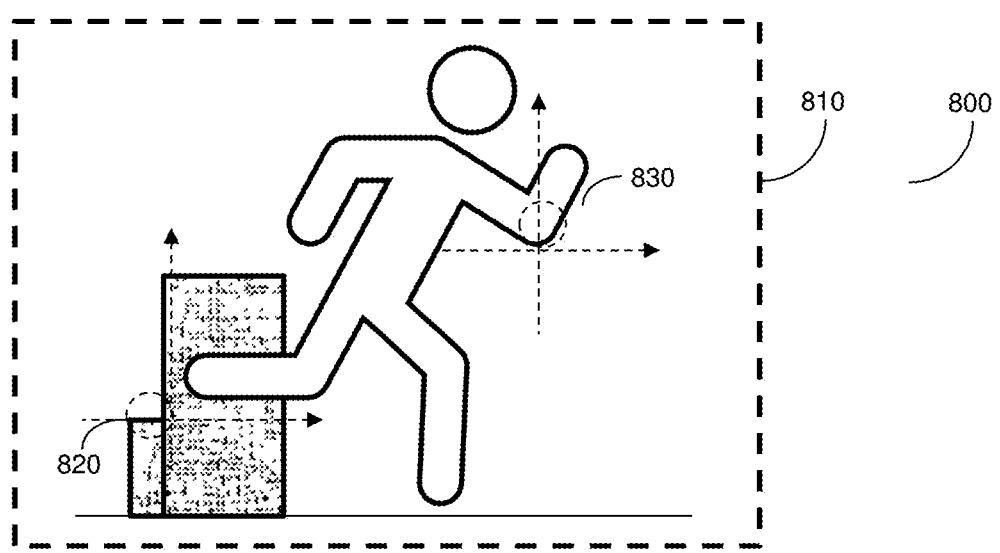
FIG. 8 is an example simulation of determining a rotation property of a candidate key point.

FIG. 8 is an example simulation 800 of determining a rotation property of a candidate key point. The simulation 800 is based on an image 810 of a superhero character standing in front of a city background and includes candidate key points 820 and 830. A rotation property may be determined for each of the candidate key points 820 and 830. The determination may include comparing rotations among the candidate key points and determining a rotation scale based on the comparison. The determination may further include analyzing the rotation of each candidate key point respective of the rotation scale and assigning a rotation score to each candidate key point. As an example, the candidate key point 820 may be assigned a lower rotation score than that of candidate key point 830 because the rotation of the candidate key point 820 (i.e., a point on the side of a vertically oriented building) is less than the rotation of the candidate key point 830 (i.e., a point on an angle of a bent elbow).

Figure 9:
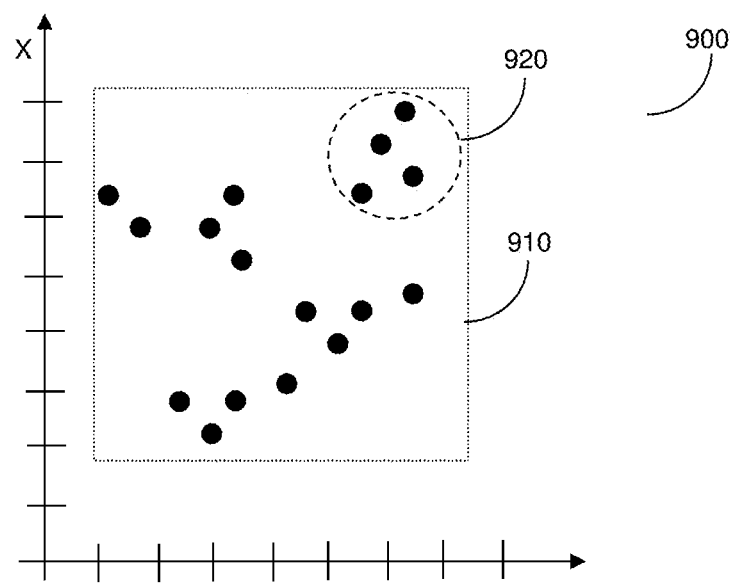
FIG. 9 is an example data plot utilized to illustrate determining a size property of a candidate key point.

FIG. 9 is an example data plot 900 utilized to illustrate determining size properties of candidate key points. The example data plot 900 includes key points 910 and a data point cluster 920. Each of the data points 910 represents a size property of a candidate key point, with the data point (0,0) representing the lowest size property and the data points of the key point cluster 920 representing the highest size properties among candidate key points. Thus, the largest candidate key points are associated with a higher size score and are the candidate key points associated with the data point cluster 920.

Figure 10:
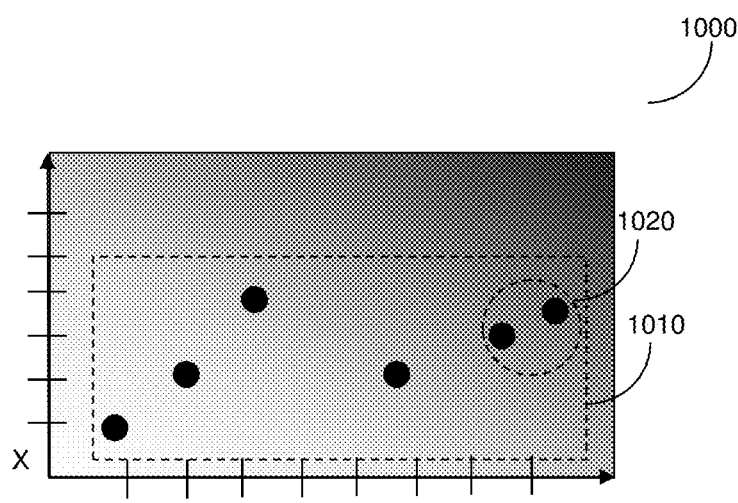
FIG. 10 is an example data plot utilized to illustrate determining a pixilation property of a candidate key point.

FIG. 10 is an example data plot 1000 utilized to illustrate determining pixilation properties of candidate key points. The pixilation properties represent visual quality of the MMCE as determined based on, e.g., resolution. The example data plot 1000 includes key points 1010 and a data point cluster 1020 where the data point (0,0) represents the lowest pixilation among candidate key points and the candidate key points having the highest pixilation are represented by data points of the cluster 1020. Key points with the higher pixilation are assigned with a higher pixilation score.

Figure 11:
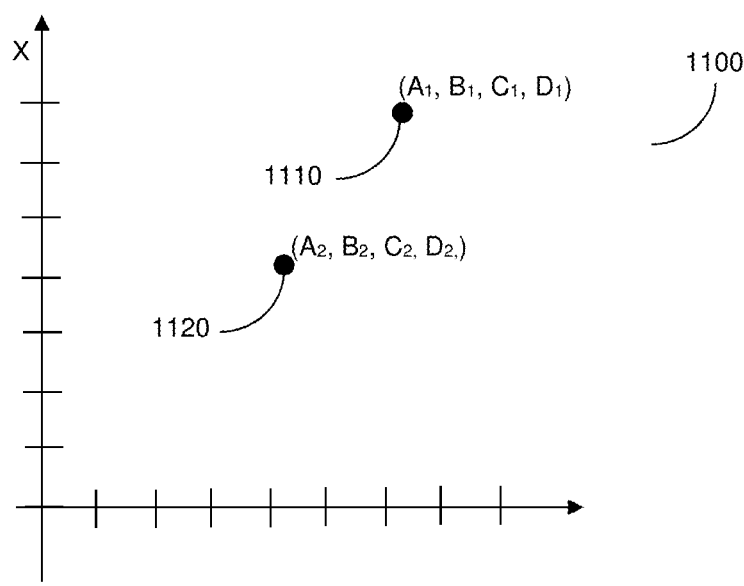
FIG. 11 is an example data plot utilized to illustrate determining a key point based on an analysis of a set of properties of each of a plurality of candidate key points.

FIG. 11 is an example data plot 1100 utilized to illustrate selecting key points based on an analysis of a set of properties of each of a plurality of candidate key points. The example data plot 1100 includes points 1110 and 1120. Each point 1110 and 1120 represents a candidate key point having a set of properties. In an example implementation, the set of properties may include 2 or 4 properties. The set of properties for each candidate key point is analyzed to determine which candidate key points are to be utilized as key points. As an example, the candidate key point may be assigned da score for each property, and one or more candidate key points having a highest average score from among a plurality of candidate key points may be selected as key points.

Figure 12:
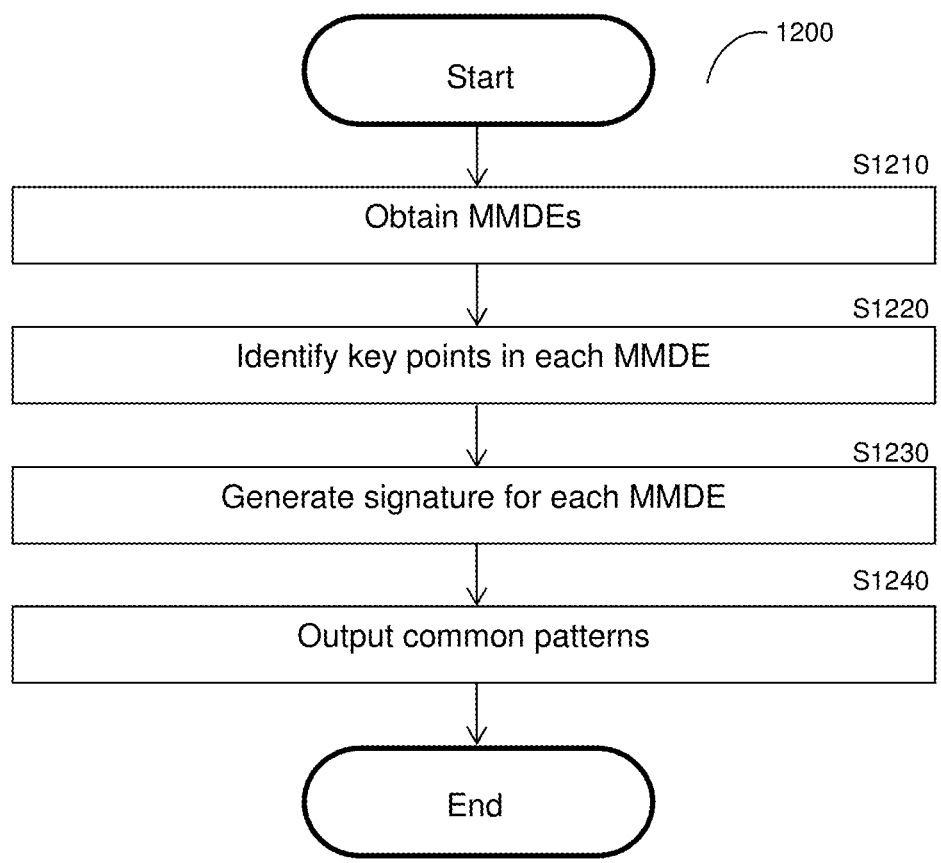
FIG. 12 is a flowchart illustrating a method for determining common patterns in multimedia data elements based on identified key points according to an embodiment.

FIG. 12 is an example flowchart 1200 illustrating a method for determining common patterns in MMDEs based on key points identified therein according to an embodiment. In an embodiment, the method may be performed by the system 100, FIG. 1.

At S1210, a plurality of MMDEs is obtained. The plurality of MMDEs may be received (e.g., from a user device), retrieved (e.g., from a storage), or a combination thereof.

At S1220, a plurality of key points in each obtained MMDE is identified. In an embodiment, the plurality of key points for each MMDE is identified as described further herein above with respect to FIGS. 3 through 5.

At S1230, based on the identified key points, a signature is generated for each of the plurality of MMDEs. The signature for each MMDE is a distinct numeric representation of the MMDE, and may be robust to noise and distortion. In an embodiment, generating the signature for each MMDE may include generating a signature for each key point in the MMDE and clustering the generated key point signatures to create the signature of the MMDE. Such key point-based signature generation results in only generating signatures for select portions of the MMDE that best represent the MMDE and, therefore, may reduce use of computing resources for signature generation, result in more accurate signatures (i.e., signatures that better represent unique aspects of the MMDE), or both.

In an embodiment, each signature may be generated by a signature generator system. The signature generator system includes a plurality of at least partially statistically independent computational cores, wherein the properties of each computational core are set independently of the properties of the other cores. A detailed description of such a signature generation process is provided in the above-mentioned U.S. Pat. No. 8,655,801.

At S1240, based on the generated signatures, at least one common pattern among the plurality of multimedia content elements is output. In an embodiment, S1240 includes matching between signatures of the plurality of multimedia content elements to identify portions of at least two signatures matching above a predetermined threshold. The matching identified portions of signatures may be utilized to generate the at least one common pattern. The at least one common pattern may be or may include a signature representing common features of two or more MMDEs. To this end, in a further embodiment, S1240 may include selecting a representative signature from among two or more matching portions of signatures to be utilized as a common pattern.

The determined common patterns may be hidden patterns, i.e., patterns that are not revealed using other methods (e.g., based on comparison of metadata associated with the MMDEs). The determined common patterns may be utilized to, e.g., organize the plurality of MMDEs, generate similarity statistics, identify anomalies, and the like. For example, the MMDEs may be grouped with respect to the determined common patterns.

Figure 13:
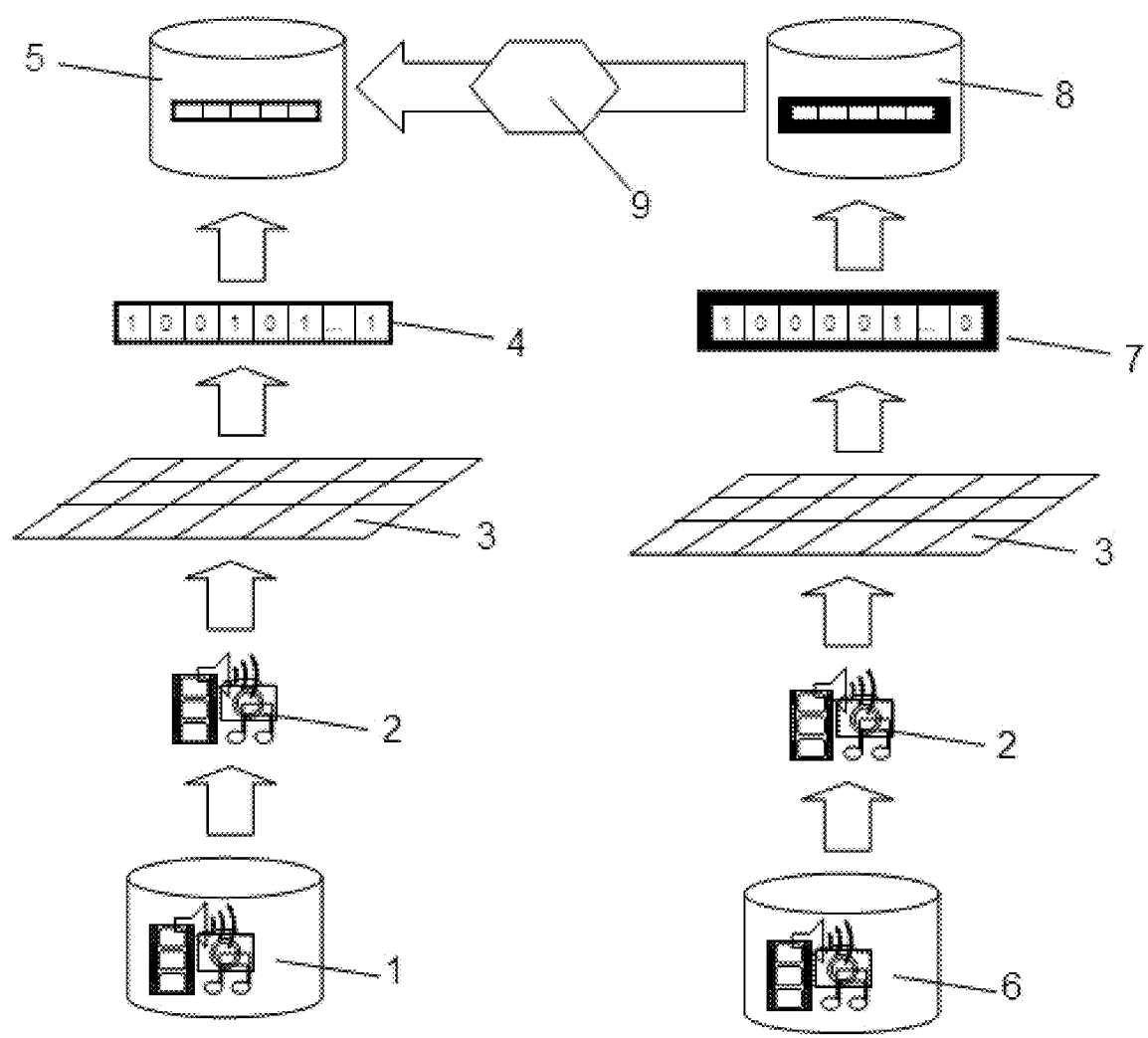
FIG. 13 is a block diagram depicting the basic flow of information in a signature generator system.
Figure 14:
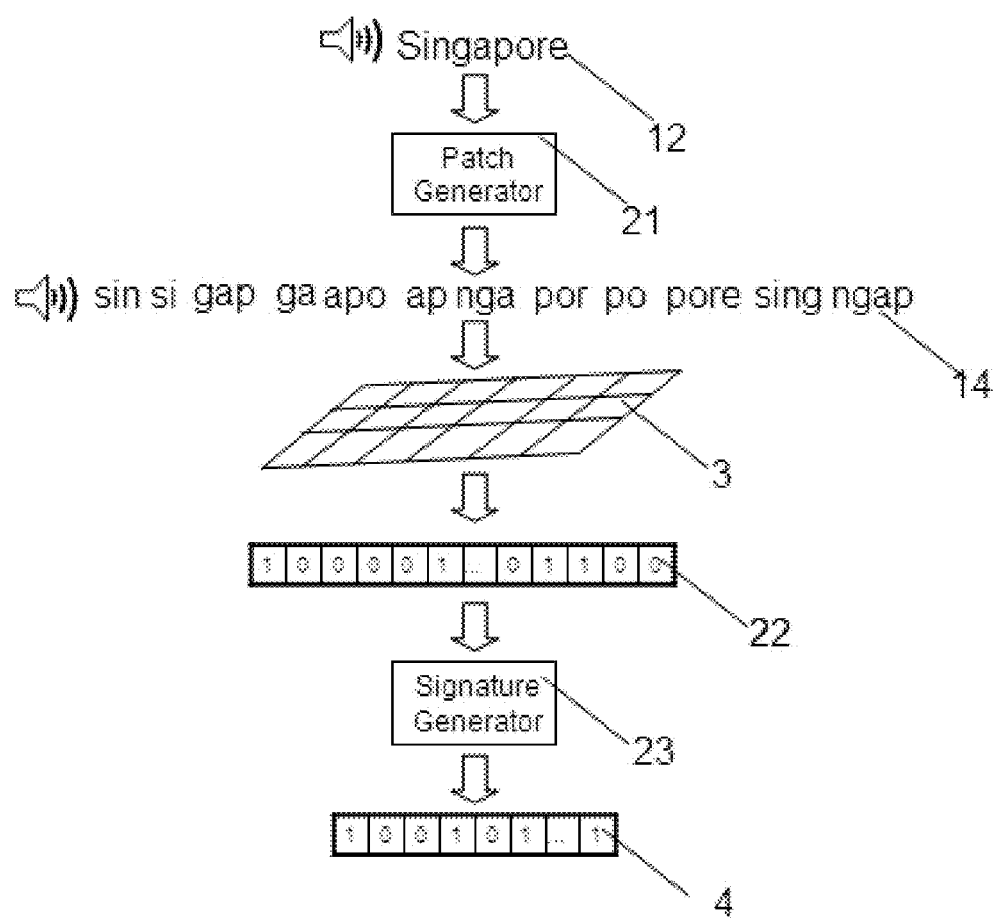
FIG. 14 is a diagram showing the flow of patches generation, response vector generation, and signature generation in a large-scale speech-to-text system.

FIGS. 13 and 14 illustrate an example for generation of signatures for the multimedia content elements according to an embodiment. An example high-level description of the process for large scale matching is depicted in FIG. 13. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 14. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 14. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the context server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \theta(V_i - Th_x)$$

where, $\theta$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); Thx is a constant Threshold value, where 'x' is 'S' for Signature and 'RS' for Robust Signature; and $V_i$ is a Coupling Node Value.

The Threshold values Thx are set differently for Signature generation and for Robust Signature generation. For example, for a certain distribution of $V_i$ values (for the set of nodes), the thresholds for Signature ($Th_S$) and Robust Signature ($Th_{RS}$) are set apart, after optimization, according to at least one or more of the following criteria:

1: For $V_i > Th_{RS}$ $1 - p(V > Th_S) - 1 - (1-\varepsilon)^l \ll 1$ i.e., given that l nodes (cores) constitute a Robust Signature of a certain image I, the probability that not all of these l nodes will belong to the Signature of same, but noisy image, $\tilde{I}$ is sufficiently low (according to a system's specified accuracy).

2:

$p(V_i > Th_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to the common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the above-referenced U.S. Pat. No. 8,655,801.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for determining common patterns in a plurality of multimedia data elements (MMDEs), comprising:
    identifying, by an array of computational cores of a processor, a plurality of candidate key points in each of the plurality of MMDEs, wherein a size of each candidate key point is equal to a predetermined size and a scale of each candidate key point is equal to a predetermined scale;
    analyzing the plurality of candidate key points in each MMDE of the plurality of MMDEs to determine a set of properties for each candidate key point;
    for each MMDE of the plurality of MMDEs, comparing the sets of properties of the plurality of candidate key points of the respective MMDE;
    selecting, for each MMDE, a plurality of key points from among the candidate key points in the respective MMDE, based on the comparing;
    generating, based on the plurality of key points for each MMDE, a signature for each MMDE to provide generated signatures; and
    comparing the generated signatures to output at least one common pattern among the plurality of MMDEs; and
    wherein the generating of the signature for each MMDE further comprises:
        generating a key point signature for each selected key point of the respective MMDE; and
        clustering the generated key point signatures to generate the signature for the respective MMDE.

2. The method of claim 1, wherein each common pattern of the at least one common pattern is a signature representing features that are common to at least two of the plurality of MMDEs.

3. The method of claim 2, wherein the comparing of the generated signatures to output the at least one common pattern further comprises: matching the generated signatures to determine at least one set of matching portions of the generated signatures ; and generating, based on the determined at least one set of matching portions, the at least one common pattern.

4. The method of claim 1, further comprising: identifying, in each MMDE, a plurality of points having the predetermined size and the predetermined scale, wherein the candidate key points are selected from among the identified plurality of points.

5. The method of claim 4, wherein the candidate key points are identified based on at least one key point representation rule.

6. The method of claim 1, wherein each set of properties comprises pixilation and at least one of: location, rotation, size, and color .

7. The method according to claim 6 wherein each set of properties comprises the pixilation, location, rotation and size.

8. The method according to claim 1 comprising: mapping each signature generated for the plurality of MMDEs into a vector space; and reducing a number of dimensions in the vector space; wherein the comparing signatures generated for the plurality of MMDEs follows the reducing of the dimensions.

9. The method according to claim 1 wherein each computational core comprises properties that are at least partly statistically independent from properties of other computational cores of the plurality of computational cores.

10. A method for determining common patterns in a plurality of multimedia data elements (MMDEs), comprising:
    identifying, by an array of computational cores of a processor, a plurality of candidate key points in each of the plurality of MMDEs, wherein a size of each candidate key point is equal to a predetermined size and a scale of each candidate key point is equal to a predetermined scale;
    analyzing the plurality of candidate key points in each MMDE of the plurality of MMDEs to determine a set of properties for each candidate key point;
    for each MMDE of the plurality of MMDEs, comparing the sets of properties of the plurality of candidate key points of the respective MMDE;
    selecting, for each MMDE, a plurality of key points from among the candidate key points in the respective MMDE, based on the comparison;
    generating, based on the plurality of key points for each MMDE, a signature for each respective MMDE;
    comparing signatures generated for the plurality of MMDEs to output at least one common pattern among the plurality of MMDEs; and
    identifying, in each MMDE, a plurality of points of the respective MMDE having the predetermined size and the predetermined scale, wherein the candidate key points are selected randomly from among the identified plurality of points of the respective MMDE.

11. The method according to claim 10 wherein the generating of the signature for each MMDE further comprises: generating a signature to each selected key point of the MMDE; and clustering the generated key point signatures to create the signature for the MMDE.

12. A method for determining common patterns in a plurality of multimedia data elements (MMDEs), comprising:
    identifying, by an array of computational cores of a processor, a plurality of candidate key points in each of the plurality of MMDEs, wherein a size of each candidate key point is equal to a predetermined size and a scale of each candidate key point is equal to a predetermined scale;
    analyzing the plurality of candidate key points in each MMDE of the plurality of MMDEs to determine a set of properties for each candidate key point;
    for each MMDE of the plurality of MMDEs, comparing the sets of properties of the plurality of candidate key points of the respective MMDE;
    selecting, for each MMDE, a plurality of key points from among the candidate key points in the respective MMDE, based on the comparison;
    generating, based on the plurality of key points for each MMDE, a signature for each respective MMDE; and
    comparing signatures generated for the plurality of MMDEs to output at least one common pattern among the plurality of MMDEs;

wherein the comparing of the sets of properties of the plurality of candidate key points further comprises:

determining a score for each property of each set of properties for each candidate key point, wherein each score is determined by comparing at least one characteristic of the candidate key point to at least one characteristic of each other candidate key point; and determining, based on the determined scores, the plurality of key points.

13. The method according to claim 12 wherein the determining of the score for each property of each set of properties for each candidate key point is responsive to a distance between the candidate key score and a center of an MMDE that comprises the candidate key point.

14. A non-transitory computer readable medium having stored thereon instructions for causing one or more processing units to execute a method, the method comprising:

identifying, via an array of computational cores of a processor of a computer vision system, a plurality of candidate key points in each of the plurality of MMDEs, wherein a size of each candidate key point is equal to a predetermined size, wherein a scale of each candidate key point is equal to a predetermined scale;

analyzing the plurality of candidate key points in each MMDE of the plurality of MMDEs to determine a set of properties for each candidate key point of the respective MMDE;

for each MMDE of the plurality of MMDEs, comparing the sets of properties of the plurality of candidate key points of the respective MMDE;

selecting, for each MMDE, a plurality of key points from among the candidate key points in the respective MMDE, based on the comparing;

generating, based on the plurality of key points for each MMDE, a signature for each MMDE;

wherein the generating of a signature for each MMDE comprises:

generating a signature to each selected key point of the respective MMDE; and clustering the generated key point signatures; and wherein the method further comprises: comparing the signatures of the plurality of MMDEs to output at least one common pattern among the plurality of MMDEs.

15. A system for identifying key points in a multimedia data element (MMDE), comprising:

a processor; and a memory, the memory containing instructions that, when executed by the processing circuitry, configure the system to:

identify, by an array of computational cores of the processing circuitry, a plurality of candidate key points in each of the plurality of MMDEs, wherein a size of each candidate key point is equal to a predetermined size, wherein a scale of each candidate key point is equal to a predetermined scale;

analyze the identified candidate key points to determine a set of properties for each candidate key point;

compare the sets of properties of the plurality of candidate key points of each MMDE; select, for each MMDE, a plurality of key points from among the candidate key points based on the comparison;

generate, based on the plurality of key points for each MMDE, a signature for the respective MMDE; and compare the signatures of the plurality of MMDEs to output at least one common pattern among the plurality of MMDEs;

wherein the system is configured to generate a signature for an MMDE by generating a signature to each selected key point of the respective MMDE; and clustering the generated key point signatures of the respective MMCE.

16. The system of claim 15, wherein each common pattern of the at least one common pattern is a signature representing features that are common to at least two of the plurality of MMDEs.

17. The system of claim 16, wherein the system is further configured to: match the signatures generated for the plurality of MMDEs to determine at least one set of matching portions of the signatures generated for the plurality of MMDEs; and generate, based on the determined at least one set of matching portions, the at least one common pattern.

18. The system of claim 15, wherein the system is further configured to: identify, in each MMDE, a plurality of points having the predetermined size and the predetermined scale, wherein the candidate key points are selected from among the identified plurality of points.

19. The system of claim 18, wherein the candidate key points are identified based on at least one key point representation rule.

20. The system of claim 15, wherein each set of properties comprises pixilation and at least one of: location, rotation, size, and color.

* * * * *